US008320632B2

(12) United States Patent
Davies

(10) Patent No.: US 8,320,632 B2
(45) Date of Patent: Nov. 27, 2012

(54) TERRAIN CORRECTION SYSTEMS

(75) Inventor: Mark Davies, Cambridgeshire (GB)

(73) Assignee: Arkex Limited, Cambridge (GB)

( * ) Notice: Subject to any disclaimer, the term of this patent is extended or adjusted under 35 U.S.C. 154(b) by 883 days.

(21) Appl. No.: 12/087,542

(22) PCT Filed: Jan. 24, 2007

(86) PCT No.: PCT/GB2007/050039
§ 371 (c)(1),
(2), (4) Date: Mar. 27, 2009

(87) PCT Pub. No.: WO2007/085875
PCT Pub. Date: Aug. 2, 2007

(65) Prior Publication Data
US 2009/0252372 A1 Oct. 8, 2009

(30) Foreign Application Priority Data
Jan. 25, 2006 (GB) .................................. 0601482.3

(51) Int. Cl.
G06K 9/00 (2006.01)
(52) U.S. Cl. ....................................... 382/109; 382/100
(58) Field of Classification Search .................. 382/100, 382/109, 218, 224, 254, 300; 324/300, 323
See application file for complete search history.

(56) References Cited

U.S. PATENT DOCUMENTS 6,484,099 B1 * 11/2002 Holzer-Popp et al. ............ 702/2
7,365,544 B2 * 4/2008 McCracken et al. .......... 324/330
2005/0017721 A1 1/2005 McCracken et al.

FOREIGN PATENT DOCUMENTS

| EP | 0 589 554 B1 | 3/1994 |
| EP | 1 091 188 B1 | 4/2001 |
| WO | WO 2007/012895 A2 | 2/2007 |

OTHER PUBLICATIONS

Rene Forsberg, "A Study of Terrain Reductions, Density Anomalies, and Geophysical Inversion Methods in Gravity Field Modelling," The Ohio State University, Apr. 1984, Scientific Report No. 5, pp. 1-129.*
International Preliminary Report on Patentability for PCT/GB2007/050039, issued Jul. 29, 2008, 7 pgs.
International Search Report for PCT/GB2007/050039, mailed Jan. 30, 2008.

* cited by examiner

Primary Examiner — Brian P Werner
Assistant Examiner — Shefali Goradia
(74) Attorney, Agent, or Firm — Foley & Lardner LLP

(57) ABSTRACT

Methods, apparatus and computer program code for terrain correction for geophysical surveys, in particular potential field surveys. A method of terrain correction for a geophysical survey involves capturing a multi- or hyperspectral image of a region to be surveyed; determining a surface geological composition of the surveyed region using the captured image multi- or hyperspectral image; determining terrain correction data for the geophysical survey using the determined surface geological composition; and using the terrain correction data for performing the terrain correction for the geophysical survey.

20 Claims, 2 Drawing Sheets

TERRAIN CORRECTION SYSTEMS

Figure 1:
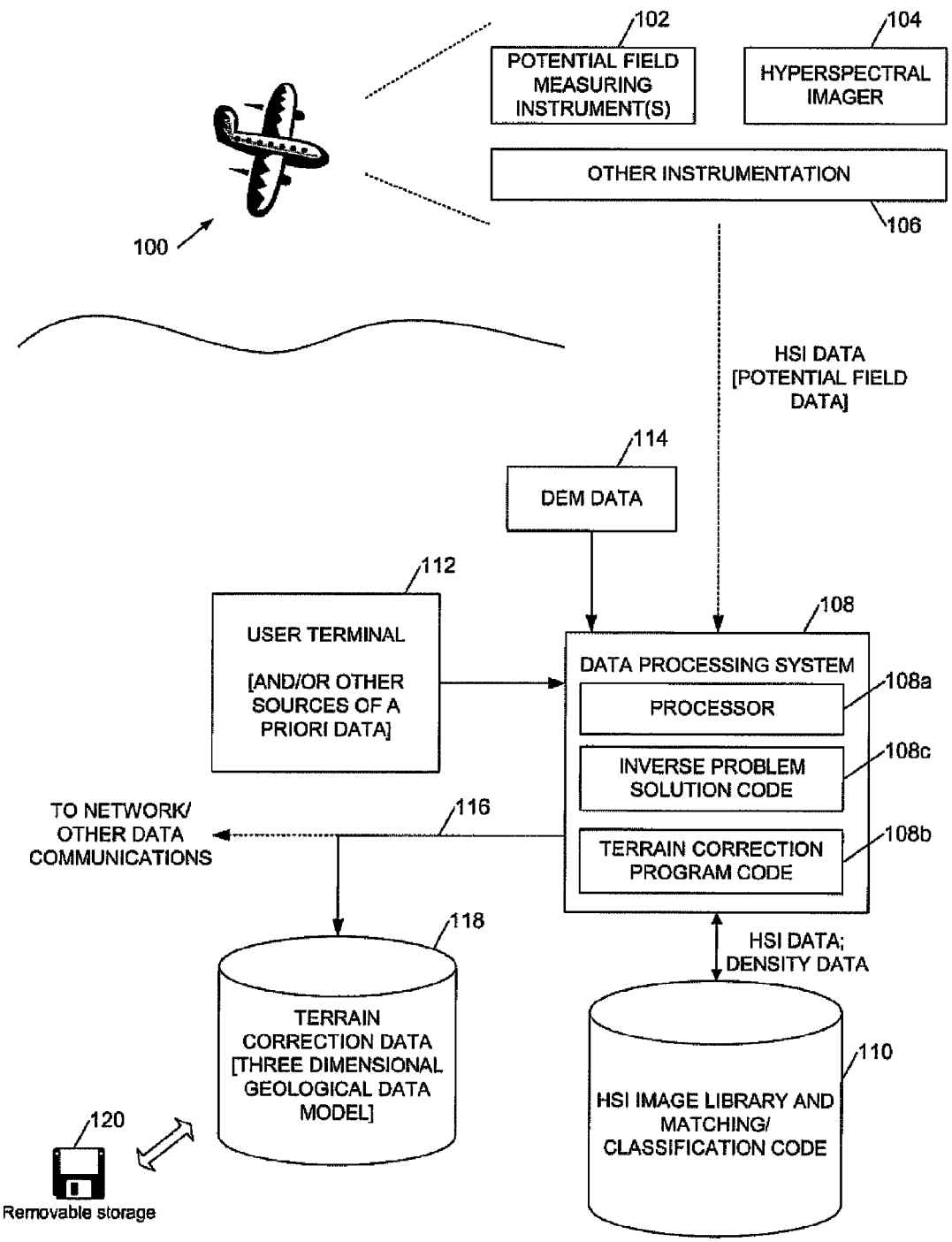

This invention is generally concerned with methods, apparatus and computer program code for terrain correction for geophysical surveys, in particular potential field surveys.

For convenience in this specification we will refer mainly to airborne surveys, and more particularly to gravity surveys. However the techniques we describe are not limited to these types of survey and may be applied to air, land or marine-based gravity surveys, or, more generally, to other potential field surveys including, but not limited to, magnetic field surveys such as magnetotelluric surveys, electromagnetic surveys and the like. A potential field survey is performed by measuring potential field data which, for a gravity survey, may comprise gravimeter data (measuring gravity field) or gravity gradiometer data (measuring gravity field gradient). In other types of survey the potential field data may comprise vector magnetometer data, true magnetic gradiometer data, or other types of data well-known to those skilled in the art. A common aim of a geophysical potential field survey is to search for signatures which potentially indicate valuable mineral deposits.

In a gravity survey nearby mass provides both high and low (spatial) frequency data, whereas the influence of a deeper mass is seen primarily at lower frequencies only. When looking for underlying anomalies the intervening mass has a dominating effect and to provide an accurate representation of deep features a good representation of surface features is desirable so as to be able to subtract-off particularly the higher frequencies (which dominate the power spectrum). For example, a signal with wavelength $\lambda$ falls off with height z as $\exp(-kz)$ where $k=2\pi/\lambda$ from which it can be estimated that a signal component of wavelength 200 meters from a mass at a depth of 100 meter has fallen to approximately $\frac{1}{20}$ of its initial value at the earth's surface (and is progressively further attenuated with increasing height), whereas it can be seen that longer wavelengths are much less attenuated. Generally the size and position of a survey is broadly chosen according to a wavelength scale corresponding to a signature expected given the target's size and depth.

Conventionally airborne potential field surveys such as gravity surveys are flown on a grid pattern. (Background prior art can be found in US2005/0017721 and EP0589554A). The grid is defined by orthogonal sets of parallel lines (flight paths) on a two-dimensional surface which is draped over the underlying terrain. The draped surface satisfies a minimum height constraint (defined by the closest the aircraft is permitted to fly to the ground) and by a constraint on the maximum rate of climb/descent of the aircraft, typically around three percent. However in hilly or mountainous terrain the surface on which the aircraft flies can vary by as much as two or three kilometers from, say, the bottom of an underlying valley to the top of the mountains/survey area. so another approach is needed. Some improved techniques for airborne potential field surveys are described in the applicant's co-pending PCT patent application "Gravity Survey Data Processing", PCT/GB2006/050211, hereby incorporated by reference in its entirety. These facilitate the collection of potential field data, in particular gravity data, from close to the ground.

After potential field data has been collected a terrain correction is generally applied prior to analysing the data. This involves compensating for the surface height variations or, more particularly, variations of the height of the aircraft above the surface of the surveyed region. Many techniques may be employed to obtain a surface profile including, but not limited to, one or more of the purchase of local digital terrain elevation data, GPS (global position system) data acquisition, and airborne techniques such Lidar (Laser radar) and SAR (synthetic aperture radar). To give an indication of the magnitude of the correction, a typical signature arising from terrain height variations may be hundreds of Eotvos whereas a typical signature of an underlying geological formation is ~1-10 Eotvos.

Despite the improved flying and data processing techniques we have previously described there remains a need for better correction of the effects of the terrain underlying the surveyed region.

According to the present invention there is therefore provided a method of terrain correction for a geophysical survey, the method comprising: capturing a multi- or hyperspectral image of a region to be surveyed; determining a surface geological composition of said surveyed region using said captured image multi- or hyperspectral image; determining terrain correction data for said geophysical survey using said determined surface geological composition; and using said terrain correction data for performing said terrain correction for said geophysical survey.

Preferably the terrain correction comprises density data defining a variation in surface density or porosity over the surveyed region. In embodiments, by employing hyperspectral imagery to compute a density (as well as an elevation) for the terrain, undesirable "ghost" images of the terrain can be substantially attenuated. This assists in effectively reducing the terrain to a flat layer. The porosity can be useful because, with relatively porous rock, the density can depend upon recent or average rainfall.

The mapping of the surface geological composition may comprise categorising the composition into one (or more) of a plurality of classes; this may be based upon a direct image of the surface rock (here used generally to include, for example, clay) for example where there is little or no vegetation, or the classification may be based upon changes in surface vegetation. It will be appreciated that the exact density need not be determined to provide some benefit and even an approximate estimate of the surface density can be helpful. The mapped density or porosity variations may comprise relative rather than absolute values.

In embodiments one or more of a variety of techniques may be employed to determine the surface geological composition from multi- or hyperspectral imagery of the surveyed region. These may include (but are not limited to) principle component analysis of the captured imagery, matching an imaged spectra against a library of stored spectral data, matched filtering of capture spectral data, and artificial neural network-based analysis of the captured image data. Optionally the technique may interpolate between two or more determined geological compositions for a pixel or region, using either linear, or non-linear interpolation. For example a single pixel may have a close match to two similar but different rock types and/or nearby or adjacent pixels may match to different related rock types. In such circumstances linear combinations of types of rock and/or spectra may be employed to determine density values in-between those associated with the identified rock types.

Preferably the geophysical survey comprises a gravity or gravity gradient survey, although in general the techniques may be employed with any potential field survey including electromagnetic field survey techniques either relying upon ambient fields (for example magnetotelluric) or employing an artificial electromagnetic field source. When the techniques are employed with gravity surveys, preferably the terrain correction density data is combined with surface elevation data for the surveyed region, which may be obtained by any of a range of conventional techniques, or purchased.

The terrain correction data may be determined and supplied for the purposes of correcting a geophysical survey, or this data may be directly employed in combination with the potential survey data for solving the "inverse problem" to determine an estimated underlying geological composition of the surveyed region.

In general the solution of such an inverse problem is under-constrained and therefore any available a priori data, for example from a physical surface survey and/or boreholes can also be helpful.

Conventional techniques for the solution of such an inverse problem can be applied except that instead of using a fixed density for the terrain correction for the surveyed region, the measured (estimated) surface density is employed. It is straightforward to modify the existing computer software to achieve this, because numerical techniques are employed. Thus as well as each element of the surface terrain having a variable height, it is also allocated a variable density; for parts of the surveyed region (if any) where the surface density is unknown or cannot be estimated with sufficient accuracy, a default density value, for example a typical upper continental crust density of 2.67 g/cc, may be employed.

In preferred embodiments the multi- or hyperspectral captured image has at least 3 wavelength bands, more preferably at least 5, 10, 50 or 100 bands. For example in a preferred embodiment 393 specific bands are employed. Preferably at least one wavelength band extends into the ultraviolet, in particular having a wavelength less than or equal to 200 nm. In preferred embodiments the multi- or hyperspectral data employed for the surface geological composition determining is mainly from the ultraviolet (less than 400 nm) region of the spectrum.

The invention also provides computer program code, in particular on a carrier to, when running, implement embodiments of the above-described method. The carrier may comprise a disc such as a DVD- or CD-rom, programmed memory, or an optical or electrical signal carrier. The computer program code may be written in any conventional computer language including high-level languages such as C or Fortran and lower level languages such as assembly code. The code may comprise source, object or executable code and may be distributed, for example across a network.

The invention also provides a conventional computer system programmed with the above-described code, and including working memory for determining the terrain correction data, and a processor. Preferably the system is linked to a system for matching hyperspectral images to rock types, and includes a data store for associating each rock type with a density and/or porosity. Preferably a user terminal is also provided for interactive determination of a three-dimensional model of underlying geological structure including the input, where available, of data from other sources such as borehole data and the like.

Figure 2:
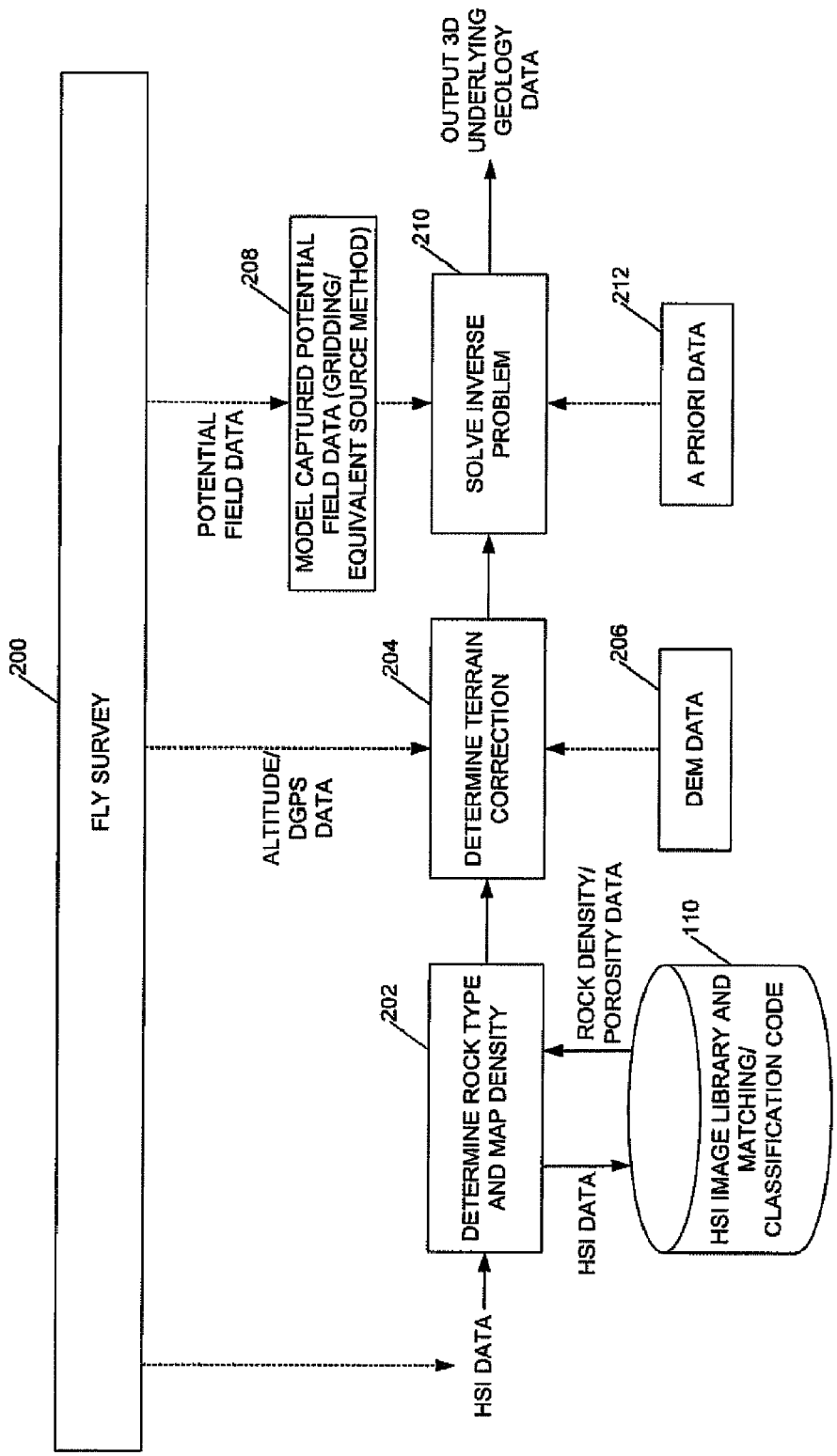

These and other aspects of the invention will now be further described, by way of example only, with reference to the accompanying figures in which:

FIG. 1 shows a block diagram of a system embodying aspects of the present invention; and FIG. 2 shows a block diagram of a procedure for implementing an embodiment of a method according to the invention.

Referring to FIG. 1, an aircraft 100 is equipped with plurality of geophysical survey instruments including one or more potential field measuring instruments 102, at least one hyperspectral imager (HSI) 104, and other instrumentation 106. The potential field measuring instruments may comprise, for example, a vector gravimeter, gravity gradiometer, magnetometer, magnetic gradiometer or the like. The other instrumentation may include GPS (Global Positioning System) instrumentation, preferably a DGPS (Differential GPS) device, an altimeter, altitude measurement equipment, pressure measurement equipment and the like. Optionally electromagnetic measurement (EM) instrumentation may be included for potential field measurement, for example, a time domain electromagnetic system (TDEM).

In one embodiment the plane is equipped to produce an accurate DEM (Digital Elevation Model) using a combination of LIDAR (Laser Radar) and an IMU (Inertial Measurement Unit). In conjunction with DGPS to correct the LIDAR data for the plane motion. The DEM and DGPS data may also be used to correct the measured potential field data for the terrain. Similarly aircraft acceleration, attitude, angular rate and angular acceleration data may also be used to correct the output data of the potential field instrumentation. The skilled person will understand that substantially any onboard or remote sensor may be employed to provide position and motion information for the aircraft and/or the potential field instrumentation.

Turning next to the hyperspectral imager 104, the skilled person will understand that, broadly speaking, this device comprises one or more imaging spectrometers to take measurements over a plurality of narrow wavelength bands over a wide wavelength range. The techniques described herein are not limited to any particular type of hyperspectral imager but preferably the device has a plurality of wavelength bands in the ultraviolet, in part because infrared signals tend to be swamped during the day. The imager may be passive or active; in the latter case techniques similar to LIDAR may be employed.

In one exemplary embodiment a hyperspectral imager was employed to capture images in 393 bands, in embodiments covering the wavelength region from less than 150 nm or 100 nm to 500 nm or more (although under certain conditions IR can be swamped, in other conditions the IR part of the spectral range is usable).

The skilled person will understand that although it is often convenient to mount the hyperspectral imager 104 in aircraft 100, in alternative embodiments of the described techniques, hyperspectral image data captured by satellite may be employed (although the resolution is generally lower, the cost higher, and the spectral coverage sub-optimal).

The hyperspectral imagery data and (if conducted at the same time) the potential field survey data is provided to a data processing system 108 comprising a processor 108a, program code for terrain correction 108b, and preferably inverse problem solution program code 108c for determining a three-dimensional model of the geological structure of the survey region from the potential field data. Data processing system 108 is coupled, optionally over a network, to an HSI image library 110 including spectrum matching/classification code. This library receives HSI data from the data processing system 108 and returns rock density data for use by the terrain correction program code. A user terminal 112 is provided for entry of any constraints on the inverse problem available from known data, for example derived from surface rather than airborne surveying. Optionally other sources of data may also provide similar input in general the more known information about the underlying geology that can be provided, the better the resulting model. Where the aircraft 100 does not gather terrain elevation data, DEM (Digital Elevation Model) data 114 may be provided separately. The data processing system 108 provides an output 116 comprising terrain correction data and, optionally, three-dimensional geological model data.

This may be stored in a database 118 and/or output over a network or provided on a removable storage medium 120.

Referring now to FIG. 2, this shows a flow diagram of a procedure for the system of FIG. 1. Data is initially derived from flying a survey 200 (in other embodiments land or marine surveying may be employed), this providing hyperspectral imagery data for use in determining rock type and mapping rock density and/or porosity 202. As mentioned above this involves matching a spectrum associated with each pixel of the captured image with a stored library of HSI data in order to classify the underlying surface rock and hence derive rock density/porosity data. The HSI data may either be categorised by employing typical reflectances from different types of underlying rock or the geology of one or more locations within the surveyed region may be locally physically examined and then relative changes with respect to these locations may be mapped; alternatively a synthesis of both techniques may be employed. For example muscovite comprises three carbonate units with different densities and local sampling may be employed to best match an absorbance band of a CO feature seen in the hyperspectral image data. Optionally the wavelength bands used to capture the hyperspectral image data may be varied according to the expected rock type—for example sandstone, which contains iron, is best surveyed in the infrared. Principal component analysis may be employed to categorise pixels into rock types or classes, for example limestone, silty lime, sandstone and so forth. Where rocks within these classes have a similar density range, the classes may optionally be combined; additionally or alternatively where different but nearby pixels define different types of rock but in a similar density range a precise classification is not needed in order to determine an approximate density for the relevant portion of the surveyed region image. Broadly speaking, however, the technique is to classify the surveyed region into categories of rock type based upon the hyperspectral image data, and then to employ a look-up table to determine an estimated density and/or porosity for the different rock types. A similar technique may be employed to determine underlying rock type or at least a category of rock type, from a hyperspectral image of vegetation growing in surface soil.

Commercially available hyperspectral image processing software includes the ENVI software available from RSI, Inc.; HSI data processing services are also available, for example from analytical imaging and Geophysicals LLC of Colorado, USA.

Many details of hyperspectral image analysis techniques can be found in the ENVI (Environment for Visualising Images) software tutorial available from RSI, Inc. of Colorado, USA (www.rsinc.com/envi/tutorial.pdf), in particular chapters 12 to 17.

Once the rock density/porosity has been mapped at step 202, the procedure then determines terrain correction data, which essentially comprises the mapped rock density in combination with a digital elevation model, either derived from the survey or from another source 206. For example an accurate DEM (digital elevation model) may be produced using a combination of LIDAR (Laser radar) and an IMU (Inertial Measurement Unit) in conjunction with DGPS (Differential Global Positioning System) to correct the LIDAR data for the plane motion. The DEM and DGPS data may also be used to correct the measured potential field data for the terrain. Likewise aircraft acceleration, attitude, angular rate and angular acceleration data may also be used to correct the output data of the potential field instrumentation. Any onboard or remote sensor can be used to provide the position and motion information for the aircraft and/or the potential field instrumentation.

The terrain correction data thus comprises a set of data defining height (elevation) and density (or porosity) at X,Y locations over the surveyed region. This is used to correct the potential field data with the aim of, in effect, reducing the terrain to a flat, uniform density layer. Prior to performing this correction the potential field data is generally pre-processed 208, for example by gridding but in some preferred embodiments of the technique using an equivalent source method as described in our earlier PCT Patent application (ibid). It is therefore helpful at this stage to outline these methods.

Potential field data includes, but is not limited to, gravimeter data, gravity gradiometer data, vector magnetometer data and true magnetic gradiometer data. Elements and representations of a potential field may be derived from a scalar quantity.

For gravity, the relevant potential is the gravity scalar potential, Φ(r), defined as $$\Phi(r) = \int\int\int \frac{G\rho(r')}{|r - r'|} d^3 r'$$

Where r, ρ(r'), G are respectively, the position of measurement of the gravity field, the mass density at location r', and the gravitational constant. The gravitational force, which is how a gravitational field is experienced, is the spatial derivative of the scalar potential. Gravity is a vector in that it has directionality—as is well known gravity acts downwards. It is represented by three components with respect to any chosen Cartesian coordinate system as:

$$g = (g_x, g_y, g_z) = \left(\frac{\partial \Phi(r)}{\partial x}, \frac{\partial \Phi(r)}{\partial y}, \frac{\partial \Phi(r)}{\partial z}\right)$$

Each of these three components varies in each of the three directions and the nine quantities so generated form the Gravity gradient tensor:

$$G = \begin{pmatrix} G_{xx} & G_{xy} & G_{xz} \\ G_{yx} & G_{yy} & G_{yz} \\ G_{zx} & G_{zy} & G_{zz} \end{pmatrix} = \begin{pmatrix} \frac{\partial}{\partial x}\frac{\partial \Phi(r)}{\partial x} & \frac{\partial}{\partial x}\frac{\partial \Phi(r)}{\partial y} & \frac{\partial}{\partial x}\frac{\partial \Phi(r)}{\partial z} \\ \frac{\partial}{\partial y}\frac{\partial \Phi(r)}{\partial x} & \frac{\partial}{\partial y}\frac{\partial \Phi(r)}{\partial y} & \frac{\partial}{\partial y}\frac{\partial \Phi(r)}{\partial zx} \\ \frac{\partial}{\partial z}\frac{\partial \Phi(r)}{\partial x} & \frac{\partial}{\partial z}\frac{\partial \Phi(r)}{\partial y} & \frac{\partial}{\partial z}\frac{\partial \Phi(r)}{\partial z} \end{pmatrix}$$

The fundamental equations and relationships of potential fields follow from analysis of the properties of the scalar potential function, its derivatives, its Fourier transforms and other mathematical quantities.

From one of Green's theorems, in the event that any of the spatial derivatives of the scalar potential (including the scalar potential itself) are known over a closed surface, then the value of that spatial derivative is known at all points within the volume enclosed by that surface. A corollary to this is that once this quantity is known at all points, by differentiation and integration, all other derivatives of the scalar potential can be derived including the scalar potential itself. Thus the scalar potential and all of its derivatives are effectively known at all points within a volume when just one of its derivatives is known over a surface closing that volume. This indicates that a full measurement of any component of any of the derivatives of the scalar potential allows the calculation of any other component of any derivative of the scalar potential. Following from this it also does not matter, at least in theory, which quantity is measured, the choice of instrumentation comes down simply to which instrument measures the desired quantity with the largest signal to noise.

Differentiation of the gravity scalar potential above ultimately yields:

$$\nabla^2 \Phi(r) = \frac{\partial^2 \Phi(r)}{\partial x^2} + \frac{\partial^2 \Phi(r)}{\partial y^2} + \frac{\partial^2 \Phi(r)}{\partial y^2}$$
$$= -4\pi G \rho(r)$$

which, in regions where there is no matter reduces to Laplace's equation, an important fundamental relationship in gravity:

$$\nabla^2 \Phi(r) = \frac{\partial^2 \Phi(r)}{\partial x^2} + \frac{\partial^2 \Phi(r)}{\partial y^2} + \frac{\partial^2 \Phi(r)}{\partial z^2}$$
$$= 0$$

Harmonic functions satisfy Laplace's equation and they have many properties which may be utilised in the analysis of data collected from potential field surveys.

Data may be analysed and processed using a range of techniques which work with the data collected from the survey as a starting point but which thereafter alter both the data and/or its format so the values associated with the measured quantities all appear on a regular 2-D grid which is on a horizontal, fixed altitude analysis plane (levelling and gridding).

In gridding, broadly speaking the surveyed region is divided into rectangular cells whose sides are preferably aligned to the principle directions flown for the survey, and then the actual measurement data is replaced with data (gridded data) which is "equivalent" to the measured data but which is now assigned values at points in the middle of each cell. The dimension of each cell may be chosen based on the average separation of lines flown in the two orthogonal directions. Once the data is in this gridded format, it is much more tractable mathematically. The data may be treated as set of numbers and may be processed, for example by statistical or other methods, to give a best estimate of the potential field on the horizontal analysis plane.

Data may be reduced to be a 2-D Fourier series in which case each line of data preferably has $2^n$ data points in order to facilitate use of a Fast Fourier transform; the data is also collected in orthogonal directions. For gravity gradient the 2-D Fourier series can be expressed as a sum of 2-D spatial sine waves in the form:

$$g_{zz}(x, y) = \sum_m \sum_n g_{zz}(k_m, k_n) e^{ik_m x} e^{ik_n y}$$

where the wavenumbers $k_m$, $k_n$, are related to the size of the survey, $L_x$, $L_y$ in the x,y directions respectively by $$k_m = \frac{2\pi}{L_x}, k_n = \frac{2\pi}{L_y}$$

However this expansion is only strictly valid at constant height unless $g_{zz}$ is a function of z. We have therefore previously described an improved, equivalent source-type method (PCT/GB2006/050211, incorporated by reference).

In an example equivalent source method the surface of the survey area is broken up into small pieces, typically of order 50 m on a side, which may be termed platelets or mass elements. It is easy to forward calculate the gravity from each platelet (see, for example, R. J. Blakely, "Potential Theory in Gravity and Magnetic Applications", Cambridge University Press, 1995), the mass of which is adjusted until the best overall fit to the measured data is obtained. This mass determination may use a standard least squares fitting procedure. The fit may be obtained by matching the data at the true measurement position to the gravity field generated by the proposed equivalent source at the identical true measurement positions. This process is mathematically rigorous and does not introduce any artificial adjustments to the data in order that it conforms to a horizontal rectangular survey.

Once this fit is obtained, the fit is deemed to be the primary data set. All subsequent analysis to determine geological structure preferably then compares and minimizes differences between the gravitational field that any given geological structure would generate with that generated by the equivalent source. One significant advantage of this technique is that the best fit comes from a mass distribution, albeit a synthetic one, and therefore the best fit solution will automatically satisfy Laplace's equation. This is an improvement over a method which produces a numerical best fit but which does not impose the added restriction that the data has to satisfy Laplace's equation, i.e. that it could come from a real mass distribution.

The equivalent source method does not have to use a surface conformal to the topography, it can use sources which cover any surface which can be at constant altitude, above or below the earth's true surface, can cut through the earth's true surface and so on. The choice of a surface following the topography is likely to produce less variation in mass of the individual platelets but the overall result is not, in principle, dramatically affected by any reasonable choice of surface.

The potential field data modelled by either a gridding or equivalent source method described above provides an input to computer program code 210 for determining a three-dimensional underlying geological structure responsible for the measured (and modelled) potential field, taking into account the terrain correction determined in step 204 and any available a priori data 212. Suitable techniques are described in the literature (see, for example Blakely, ibid, and references therein) additionally or alternatively commercially available program code may be employed, for example or the GRMAG3D code available from the Consortium for Electromagnetic Modelling and Inversion (CEMI) based at the University of Utah, USA.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of terrain correction for a geophysical survey, the method comprising:
    capturing a multi- or hyperspectral image of a region to be surveyed;
    determining a surface geological composition of said surveyed region using said captured multi- or hyperspectral image;
    determining, using a data processing system, terrain correction data for said geophysical survey using said determined surface geological composition wherein said terrain correction data comprises density data defining a variation in surface density or porosity over said surveyed region and wherein said determining of terrain correction data comprises combining said density data with surface elevation data for said surveyed region; and using said terrain correction data for performing said terrain correction for said geophysical survey.

2. A method as claimed in claim 1, wherein said determining of terrain correction data further comprises interpolating between two or more surface geological compositions for one or more pixels of said captured multi- or hyperspectral image.

3. A method as claimed in claim 1, wherein said determining of surface geological composition is responsive to changes in surface vegetation of said surveyed region.

4. A method as claimed in claim 1, wherein said determining of surface geological composition comprises classifying parts of said surveyed region into ones of a plurality of surface geological composition classifications.

5. A method as claimed in claim 1, wherein said determining of surface geological composition comprises one or more of a principal component analysis of said captured multi- or hyperspectral image, a matching operation on said captured multi- or hyperspectral image using a library of stored spectral data, matched filtering of said captured image, and artificial neural network-based analysis of said captured multi- or hyperspectral image.

6. A method as claimed in claim 1, wherein said geographical survey comprises a gravity or gravity gradient survey.

7. A method as claimed in claim 1, further comprising performing said terrain corrected geophysical survey to determine an estimated underlying geological composition of said surveyed region.

8. A method as claimed in claim 1, wherein said captured multi- or hyperspectral image comprises at least 3 wavelength bands.

9. A method as claimed in claim 8, wherein said captured multi- or hyperspectral image comprises at least 5 wavelength bands.

10. A method as claimed in claim 9, wherein said captured multi- or hyperspectral image comprises at least 10 wavelength bands.

11. A method as claimed in claim 10, wherein said captured multi- or hyperspectral image comprises at least 100 wavelength bands.

12. A method as claimed in claim 1, wherein said captured multi- or hyperspectral image includes a plurality of wavelength bands at a wavelength of equal to or less than 400 nm.

13. A non-transitory computer-readable medium, comprising program control code which, when executed on a processor, causes the processor to perform operations for performing a terrain correction for a geophysical survey, the operations comprising:

capturing a multi- or hyperspectral image of a region to be surveyed;

determining a surface geological composition of said surveyed region using said captured multi- or hyperspectral image;

determining terrain correction data for said geophysical survey using said determined surface geological composition wherein said terrain correction data comprises density data defining a variation in surface density or porosity over said surveyed region and wherein said determining of terrain correction data comprises combining said density data with surface elevation data for said surveyed region; and using said terrain correction data for performing said terrain correction for said geophysical survey.

14. A system for performing a terrain correction for a geophysical survey, said system comprising:

a hyperspectal imager for capturing a multi- or hyperspectral image of a region to be surveyed; and a data processing system configured to:
determine a surface geological composition of said surveyed region using said captured multi- or hyperspectral image:, determine terrain correction data for said geophysical survey using said determined surface geological composition wherein said terrain correction data comprises density data defining a variation in surface density or porosity over said surveyed region and wherein said terrain correction data is determined by combining said density data with surface elevation data for said surveyed region; and use said terrain correction data for performing said terrain correction for said geophysical survey.

15. A system as claimed in claim 14, wherein said determining of terrain correction data further comprises interpolating between two or more surface geological compositions for one or more pixels of said captured multi- or hyperspectral image.

16. A system as claimed in claim 14, wherein said determining of surface geological composition is responsive to changes in surface vegetation of said surveyed region.

17. A system as claimed in claim 14, wherein said determining of surface geological composition comprises one or more of a principal component analysis of said captured multi- or hyperspectral image, a matching operation on said captured multi- or hyperspectral image using a library of stored spectral data, matched filtering of said captured image, and artificial neural network-based analysis of said captured multi- or hyperspectral image.

18. A system as claimed in claim 14, wherein the data-processing system is further configured to perform said terrain corrected geophysical survey to determine an estimated underlying geological composition of said surveyed region.

19. A system as claimed in claim 14, wherein said captured multi- or hyperspectral image comprises at least 3 wavelength bands.

20. A system as claimed in claim 14, wherein said captured multi- or hyperspectral image includes a plurality of wavelength bands at a wavelength of equal to or less than 400 nm.

* * * * *